(12) United States Patent
Kim (10) Patent No.: US 7,861,742 B2
(45) Date of Patent: Jan. 4, 2011

(54) CARTRIDGE OF WATER SUPPLY VALVE

(76) Inventor: Jong Koo Kim, 924 Dongchun 1-Dong, Yeonsu-Gu, 207-304 Daelim 2-Cha Apt., Incheon (KR) 406-131

( * ) Notice: Subject to any disclaimer, the term of this patent is extended or adjusted under 35 U.S.C. 154(b) by 347 days.

(21) Appl. No.: 12/064,218

(22) PCT Filed: Mar. 14, 2006

(86) PCT No.: PCT/KR2006/000910

§ 371 (c)(1), (2), (4) Date: Feb. 19, 2008

(87) PCT Pub. No.: WO2007/021064

PCT Pub. Date: Feb. 22, 2007

(65) Prior Publication Data

US 2008/0210318 A1 Sep. 4, 2008

(30) Foreign Application Priority Data

Aug. 17, 2005 (KR) .................... 10-2005-0075152
Nov. 8, 2005 (KR) .................... 10-2005-0106445

(51) Int. Cl.
*F16K 11/18* (2006.01)
(52) U.S. Cl. .................. 137/625.4; 137/636; 137/636.2
(58) Field of Classification Search ............. 137/625.4, 137/636, 636.2, 636.3, 637, 801
See application file for complete search history.

(56) References Cited

U.S. PATENT DOCUMENTS 2,839,085 A * 6/1958 Otto ........................ 137/636.2
3,612,104 A * 10/1971 Busquets ................. 137/637.4
4,325,403 A * 4/1982 Uhlmann ................ 137/315.11
4,653,535 A * 3/1987 Bergmann ............. 137/625.17
5,329,958 A 7/1994 Bosio
5,417,242 A * 5/1995 Goncze ................. 137/625.17
6,176,250 B1 * 1/2001 Lin et al. ..................... 137/98

FOREIGN PATENT DOCUMENTS

| JP | 08-159309 | 6/1996 |
| JP | 09-178008 | 7/1997 |
| KR | 2019950009326 | 4/1995 |
| KR | 1020030079039 | 10/2003 |

* cited by examiner

*Primary Examiner* — John Rivell
*Assistant Examiner* — Kevin Murphy
(74) *Attorney, Agent, or Firm* — Park & Associates IP Law LLC (57) ABSTRACT

A cartridge of a water supply valve that controls the flow rate and temperature of water without causing interference between flow rate control operation and temperature control operation of the valve. In the cartridge, a flow rate control knob (12) angularly moves forwards and rearwards and actuates a control lever (14) to open or close cold and hot water supply holes (1a and 1b). A temperature control knob (13) is coupled to the flow rate control knob (12), linearly moves leftwards and rightwards, and actuates the control lever (14) to control the opening ratios of the water supply holes. Thus, this cartridge does not change the existing temperature of water during flow rate control operation or change the existing flow rate of water during temperature control operation. This invention reduces the quantity of water to be unnecessarily wasted and, at the same time, prevents undesirable consumption of excessive energy.

16 Claims, 11 Drawing Sheets

cross section of opened part of cold water supply hole cross section of opened part of hot water supply hole

[Fig. 13]

cross section of opened part of cold water supply hole cross section of opened part of hot water supply hole

CARTRIDGE OF WATER SUPPLY VALVE

TECHNICAL FIELD

The present invention relates, in general, to cartridges of water supply valves and, more particularly, to a cartridge of a water supply valve that controls the flow rate and temperature of water without causing interference between flow rate control operation and temperature control operation of the valve.

BACKGROUND ART

Generally, a water supply valve, which is configured to control the temperature and flow rate of water when supplying water, means a water control valve that controls the flow rate of water supplied from an outside water source (including hot water supplied from a boiler) and controls the temperature of water by selecting cold water or hot water, or by mixing cold water and hot water.

The water supply valve capable of controlling the temperature and flow rate of water may be installed in a kitchen, at an appropriate position above a sink, or in a bathroom (including a public bath), at a predetermined position so that a user can easily use water by manipulating the valve as desired.

Conventional water supply valves to control the temperature and flow rate of water when supplying water have been classified into knob-operated valves, which can control the flow rate and temperature of water by manipulating rotary knobs to select cold water or hot water or to mix the cold water and hot water, and lever-operated valves, which can control the flow rate of water by moving a lever upwards or downwards and control the temperature of water by rotating the lever leftwards or rightwards to select cold water, hot water, or a mix of the cold water and hot water.

Described in detail, in conventional knob-operated water supply valves, a cold water knob, which is manipulated to discharge cold water at a controlled flow rate, and a hot water knob, which is manipulated to discharge hot water at a controlled flow rate, are provided on opposite sides of a valve body. Thus, when it is desired to use cold water or hot water exclusively, a user can easily control the flow rate of water by manipulating a knob designated for cold water or hot water. However, when it is desired to use mixed water of a desired temperature (between the temperature of hot water and the temperature of cold water), the two knobs (for cold water and hot water) must be carefully manipulated to provide the desired temperature so that the knobs trouble users while manipulating the knobs and the knob-operated valves are inconvenient to the users.

Particularly, the conventional knob-operated valves each have a plurality of valve cartridges used for separately controlling the flow rates of cold water and hot water. Thus, the valve cartridges of each of the conventional knob-operated valves comprise many elements, complicating the construction of the water supply valves.

In an effort to overcome the above-mentioned problems, in recent years, a water supply valve which has a structure to control the flow rate and temperature of water at a predetermined position therein has been proposed and used. However, this water supply valve causes a structural problem in which the valve may change the existing temperature of water during flow rate control operation and change the existing flow rate of water during temperature control operation. Thus, this water supply valve may unnecessarily waste water and may start operation of a boiler to heat water, and un-desirably consume excessive energy.

DISCLOSURE OF INVENTION

Technical Problem

Accordingly, the present invention has been made keeping in mind the above problems occurring in the prior art, and an object of the present invention is to provide a cartridge of a water supply valve that can control the flow rate and temperature of water without causing interference between flow rate control operation and temperature control operation of the valve.

Technical Solution

The present invention provides a cartridge of a water supply valve, including: a water supply and discharge means provided with cold and hot water supply holes and a water discharge hole to separately supply cold and hot water into the cartridge and discharge a mix of the cold and hot water from the cartridge; a control unit to open or close the cold and hot water supply holes of the water supply and discharge means; and a housing assembled at a first end thereof with an end of the water supply and discharge means to define a chamber therein and receiving elements of the cartridge in the chamber to protect the elements, the cartridge further including a valve control means having: a flow rate control knob coupled by a hinge to a second end of the housing, which is assembled with the water supply and discharge means, so that the flow rate control knob is angularly moved forwards and rearwards within a pre-determined angular range and actuates a control lever, an end of which is coupled to the control unit, forwards and rearwards, thus causing the control unit to open or close the cold and hot water supply holes of the water supply and discharge means; and a temperature control knob movably coupled to the flow rate control knob such that the temperature control knob linearly moves leftwards and rightwards relative to the flow rate control knob within a predetermined linear range without causing interference with operation of the flow rate control knob, and actuates the control lever, which is coupled to the control unit, leftwards and rightwards, thus causing the control unit to control the opening ratios of the cold and hot water supply holes of the water supply and discharge means.

Advantageous Effects

The cartridge of the water supply valve according to the present invention is operated such that the flow rate of water is controlled by angularly moving the flow rate control knob forwards or rearwards and the temperature of water is controlled by linearly moving the temperature control knob leftwards or rightwards. This cartridge controls the flow rate and temperature of water without causing interference between the flow rate control operation and the temperature control operation. Thus, this cartridge does not change the existing temperature of water during flow rate control operation or change the existing flow rate of water during temperature control operation. Therefore, the present invention reduces the quantity of water to be unnecessarily wasted and, at the same time, prevents undesirable consumption of excessive energy.

DESCRIPTION OF THE ELEMENTS IN THE DRAWINGS

10: cartridge 11: valve control means
12: flow rate control knob 13: temperature control knob
14: control lever 15: control unit
16: control disk 17: guide
18: control lever support
1: water supply and discharge means 2: housing

BEST MODE FOR CARRYING OUT THE INVENTION

The present invention provides a cartridge of a water supply valve, comprising: a water supply and discharge means provided with cold and hot water supply holes and a water discharge hole to separately supply cold and hot water into the cartridge and discharge a mix of the cold and hot water from the cartridge; a control unit to open or close the cold and hot water supply holes of the water supply and discharge means; and a housing assembled at a first end thereof with an end of the water supply and discharge means to define a chamber therein and receiving elements of the cartridge in the chamber to protect the elements, the cartridge further comprising valve control means, comprising: a flow rate control knob coupled by a hinge to a second end of the housing, which is assembled with the water supply and discharge means, so that the flow rate control knob is moved forwards and rearwards within a predetermined angular range and actuates a control lever, an end of which is coupled to the control unit, forwards and rearwards, thus causing the control unit to open or close the cold and hot water supply holes of the water supply and discharge means; and a temperature control knob movably coupled to the flow rate control knob such that the temperature control knob linearly moves leftwards and rightwards relative to the flow rate control knob within a predetermined linear range without causing interference with operation of the flow rate control knob, and actuates the control lever, which is coupled to the control unit, leftwards and rightwards, thus causing the control unit to control the opening ratios of the cold and hot water supply holes of the water supply and discharge means.

In the cartridge of the present invention, the flow rate control knob of the valve control means may comprise: two hinge brackets formed on the flow rate control knob, spaced apart from each other by a predetermined distance and coupled to the housing by the hinge; and two slide rails symmetrically formed on an end of the flow rate control knob opposite the end having the hinge brackets, such that the slide rails extend parallel to and spaced apart from each other at a predetermined interval.

Furthermore, the temperature control knob of the valve control means may be formed as a block-shaped body and comprise: a slide groove formed along each of two opposite side surfaces of the block-shaped body and engaged with an associated slide rail of the flow rate control knob; and a lever coupling hole formed on an end surface of the block-shaped body, into which an end of the control lever is inserted and coupled.

In the above case, the control lever coupling hole may be formed as a hole having a rounded inner surface to allow one end of the control lever to smoothly move in the hole in any direction.

Furthermore, the control lever may be formed as a rod-shaped body and comprise: end joint balls, having a diameter larger than a diameter of a rod part of the control lever, formed at opposite ends of the control lever and coupled to respective control lever coupling holes of both the temperature control knob and the control disk; and an intermediate ball, having a diameter larger than the diameter of the end joint balls, formed around an intermediate portion of the control lever and seated in a rounded seat formed in a control lever support and functioning as a point of action of the control lever during rotation of the lever.

In addition, the control lever, which is seated in the rounded seat of the control lever support, may be supported by a separate packing that is held in a support sleeve extending downwards from the center of the inner surface of the top wall of the housing.

Furthermore, the control unit may comprise: a control disk to open or close the cold and hot water supply holes of the water supply and discharge means; and a guide to guide rectilinear movement of the control disk in forward and rearward directions, thus causing the control disk to open or close the cold and hot water supply holes of the water supply and discharge means.

Furthermore, the control unit may further comprise: a control lever support, which guides linear movement of the guide in leftward and rightward directions, thus causing the guide to guide rectilinear movement of the control disk in leftward and rightward directions, and supports the control lever therein such that the control lever acts as leverage.

In the present invention, the control disk may be formed as a disk having a minor axis, a major axis and predetermined thickness, and may comprise: a control lever coupling hole formed on the center of a first surface of the control disk to receive therein an end of the control lever; a pair of drain channels formed on a second surface of the control disk, opposite the first surface having the control lever coupling hole, in radial directions at diametrically opposite positions such that the drain channels are isolated from each other; and a pair of flow rate control guide channels formed on the first surface having the control lever coupling hole in radial directions perpendicular to the directions of the drain channels at positions outside the control lever coupling hole.

In the above case, the control lever coupling hole, which is formed in the control disk of the control unit, may be formed as a hole having a rounded inner surface to allow the other end of the control lever to smoothly move in the hole in any direction.

Furthermore, the guide may be formed as a ring-shaped disk and may comprise: a pair of flow rate control guide ribs formed on a surface of the guide in radial directions at diametrically opposite positions outside a center through hole of the guide to correspond to the pair of flow rate control guide channels of the control disk; and a pair of temperature control guide ribs formed on another surface of the guide, opposite the surface having the flow rate control guide ribs, in radial directions perpendicular to the directions of the flow rate control guide ribs.

In addition, the control lever support may be formed as a ring-shaped block having a center through hole, with an intermediate portion around an inner surface of the center through hole protruding inwards and a part of the inner surface being rounded to form a seat for the control lever, and may comprise: a pair of temperature control guide channels formed on a surface of the control lever support to correspond to the pair of temperature control guide ribs of the guide; and a locking rib to engage with a locking groove formed on an inner surface of the support sleeve provided in the housing, thus preventing movement of the control lever support relative to the housing.

Furthermore, the water supply and discharge means may be formed as a ring-shaped block and comprise: a pair of pipes provided at a central part of the block such that the pipes are spaced apart from each other at a predetermined interval, the pipes having first ends connected to respective external water supply pipe lines and second ends forming the cold and hot water supply holes which correspond to the control disk of the control unit, with the water discharge hole being defined in the block at a position outside the pipes.

In the above case, each of the pipes may be provided therein with a packing elastically biased by a spring and having rectangular water passage hole.

Furthermore, the housing may be formed as a cylinder and comprise: a boss formed on a first end of the housing, with a through rectangular hole being formed through the center of the boss and having a diameter smaller than a diameter of an opening formed at a second end of the housing, and a support sleeve extending from an inner end of the boss to define a space therein to receive the control lever support and bias the guide of the control unit to the control disk at an end thereof.

Preferred embodiments of the present invention will be described in detail herein below with reference to the accompanying drawings.

Figure 1:
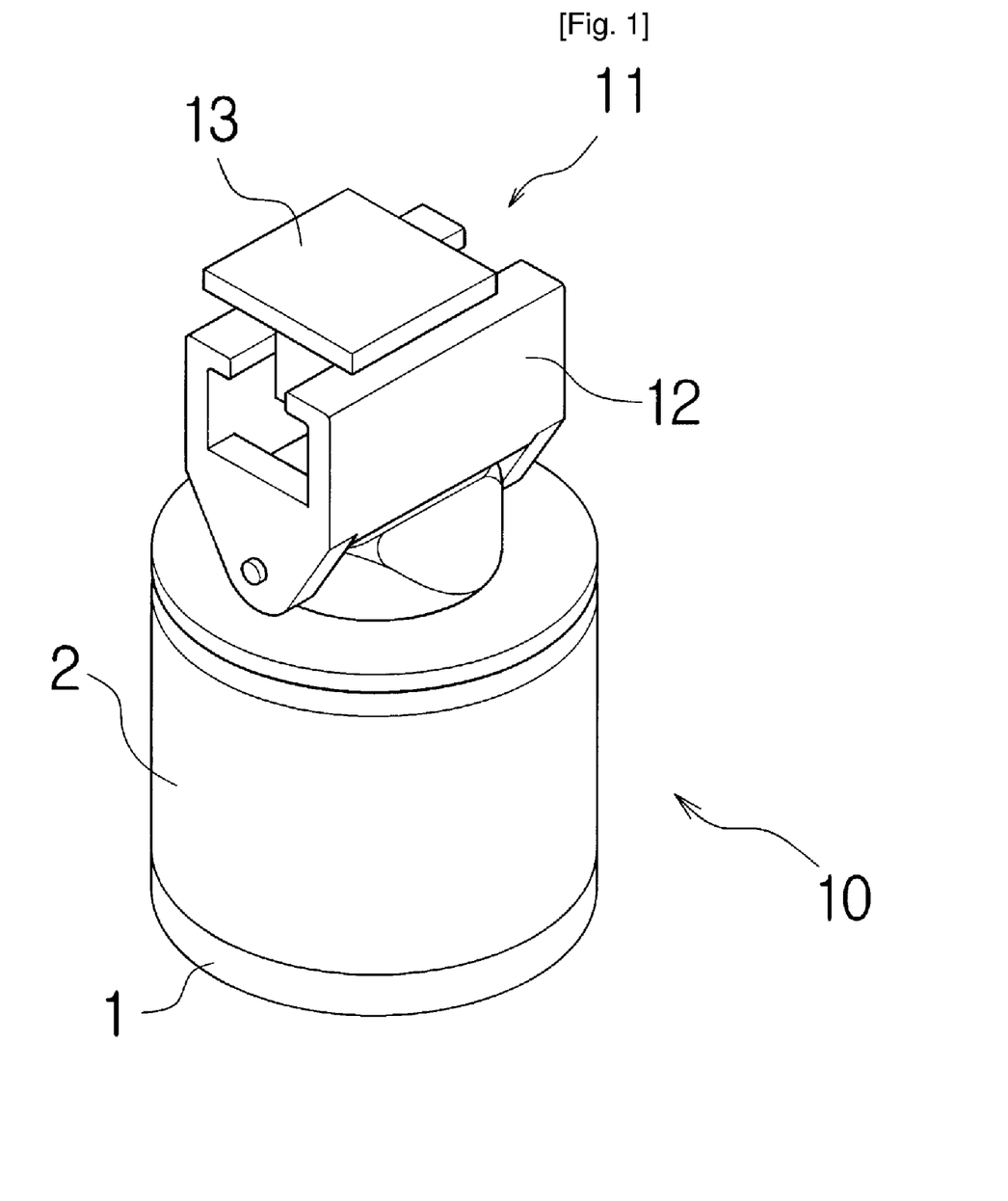
FIG. 1 is a perspective view illustrating the construction of a cartridge of a water supply valve according to a first embodiment of the present invention.
Figure 2:
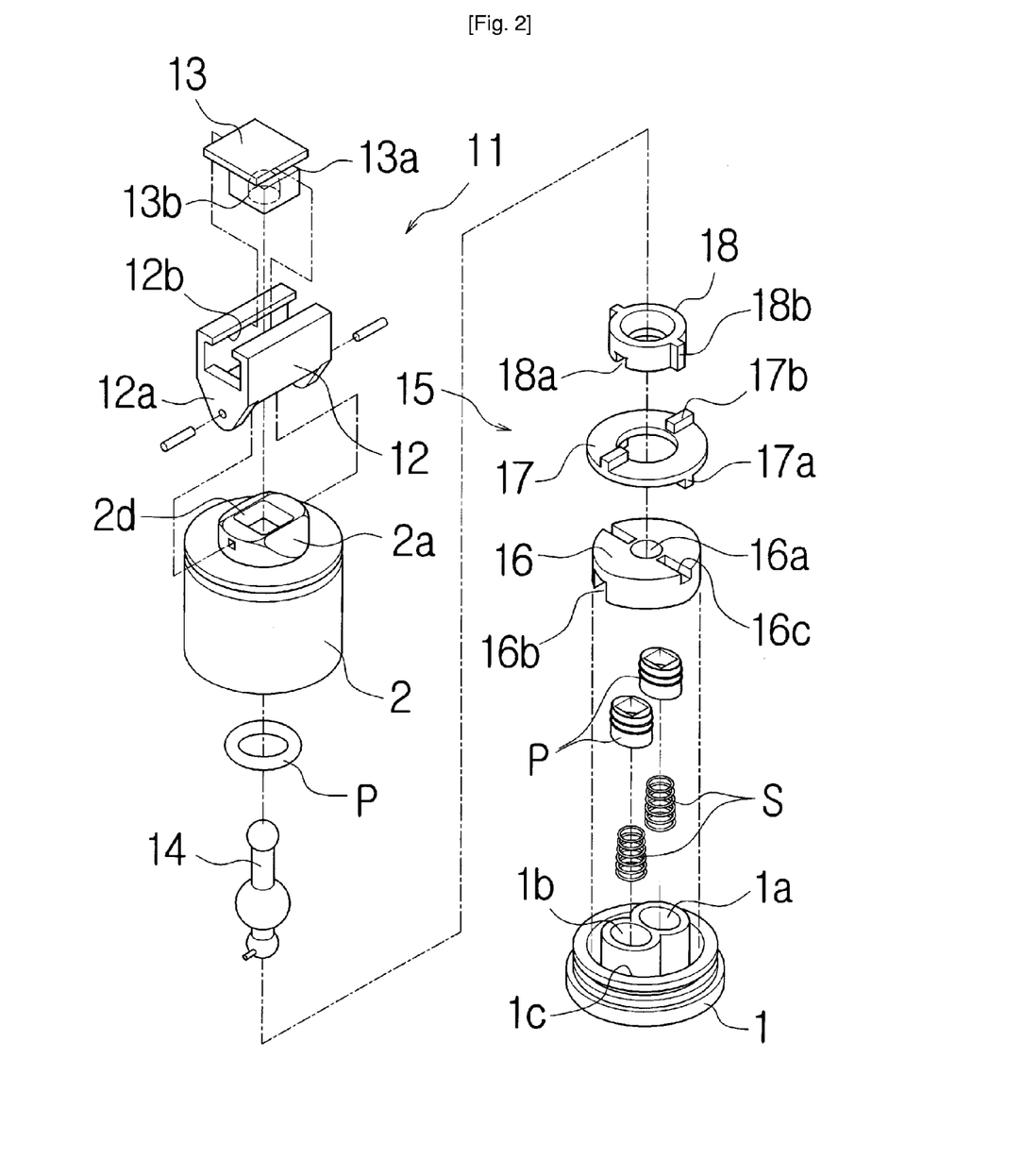
FIG. 2 is an exploded perspective view illustrating the construction of the cartridge according to the first embodiment of the present invention in detail.
Figure 3:
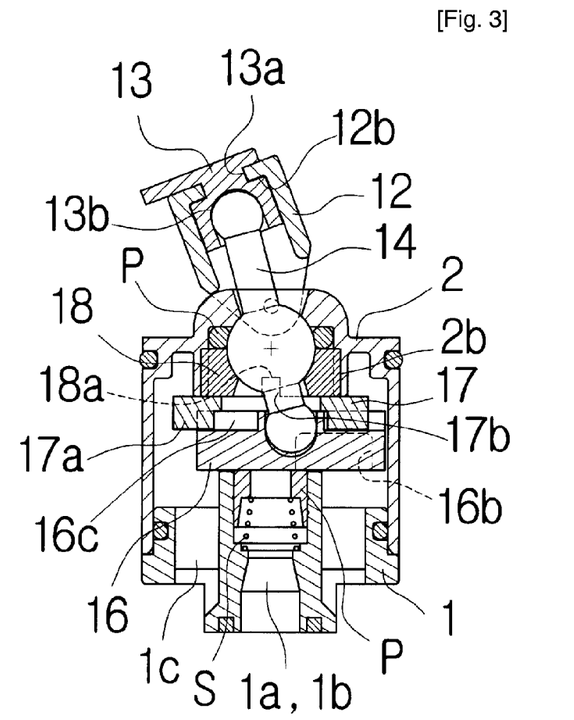
FIG. 3 is a front sectional view illustrating the construction of the cartridge according to the first embodiment of the present invention (in an closed state)

As shown in FIGS. 1 through 3, the present invention provides a cartridge of a water supply valve. This cartridge comprises a water supply and discharge means 1 provided with cold and hot water supply holes 1a and 1b and a water discharge hole 1c to separately supply cold and hot water into the cartridge and discharge a mix of the cold and hot water from the cartridge. A control unit 15 is provided to open or close the cold and hot water supply holes 1a and 1b of the water supply and discharge means 1. A housing 2 is assembled at a first end thereof with an end of the water supply and discharge means 1, thus defining a chamber therein and receiving elements of the cartridge in the chamber to protect the elements. The cartridge further comprises a valve control means 11. The valve control means 11 comprises a flow rate control knob 12, which is coupled by a hinge to a second end of the housing 2 that is assembled with the water supply and discharge means 1. Thus, the flow rate control knob 12 is moved forwards and rearwards within a predetermined angular range and actuates a control lever 14, an end of which is coupled to the control unit 15, forwards and rearwards, so that the control unit 15 opens or closes the cold and hot water supply holes 1a and 1b of the water supply and discharge means 1. The valve control means 11 further includes a temperature control knob 13, which is movably coupled to the flow rate control knob 12 such that the temperature control knob 13 linearly moves leftwards and rightwards relative to the flow rate control knob 12 within a predetermined linear range without causing interference with operation of the flow rate control knob 12. The temperature control knob 13 thus actuates the control lever 14, which is coupled to the control unit 15, leftwards and rightwards, and causes the control unit 15 to control the opening ratios of the cold and hot water supply holes 1a and 1b of the water supply and discharge means 1.

In the cartridge of this invention, the flow rate control knob 12 of the valve control means 11 includes a plurality of hinge brackets 12a, which is formed on the flow rate control knob 12 and is spaced apart from each other by a predetermined distance and is coupled to the housing 2 by the hinge. The flow rate control knob 12 further includes two slide rails 12b, which are symmetrically formed on an end of the flow rate control knob 12 opposite the end having the hinge brackets 12a, such that the slide rails 12b extend parallel to and spaced apart from each other at a predetermined interval.

Furthermore, the temperature control knob 13 of the valve control means 11 is formed as a block-shaped body and includes a slide groove 13a, which is formed along each of two opposite side surfaces of the block-shaped body and engaged with an associated slide rail 12b of the flow rate control knob 12. A lever coupling hole 13b is formed on an end surface of the block-shaped body, into which an end of the control lever 14 is inserted and coupled.

In the above case, the control lever coupling hole 13b is preferably formed as a hole having a rounded inner surface to allow one end of the control lever 14 to smoothly move in the hole 13b in any direction.

Furthermore, the control lever 14 is formed as a rod-shaped body, with two end joint balls, having a diameter larger than the diameter of a rod part of the control lever 14, formed at opposite ends of the control lever 14 and coupled to respective control lever coupling holes 13b and 16a of both the temperature control knob 13 and a control disk 16. The control lever 14 further includes an intermediate ball, which has a diameter larger than the diameter of the end joint balls and is formed around the intermediate portion of the control lever 14 and is seated in a rounded seat formed in a control lever support 18 and functions as a center of pivot of the control lever 14 during rotation of the lever 14.

In addition, the control lever 14, which is seated in the rounded seat of the control lever support 18, is preferably supported by a separate packing P that has a ring shape and is held in a support sleeve 2b extending downwards from the center of the inner surface of the top wall of the housing 2.

In the present invention, the control unit 15 comprises a control disk 16 to open or close the cold and hot water supply holes 1a and 1b of the water supply and discharge means 1. The control unit 15 further includes a guide 17, which guides rectilinear movement of the control disk 16 in forward and rearward directions, thus causing the control disk 16 to open or close the cold and hot water supply holes 1a and 1b of the water supply and discharge means 1.

Furthermore, the control unit 15 further includes the control lever support 18, which guides linear movement of the guide 17 in leftward and rightward directions, thus causing the guide 17 to guide rectilinear movement of the control disk 16 in leftward and rightward directions, and supports the control lever 14 therein, such that the control lever 14 acts in leverage.

In the present invention, the control disk 16 is formed as a disk having a minor axis, a major axis and predetermined thickness. This control disk 16 includes the control lever coupling hole 16a, which is formed on the center of a first surface of the control disk 16 to receive therein an end of the control lever 14. A pair of drain channels 16b is formed on a second surface of the control disk 16, opposite the first surface having the control lever coupling hole 16a, in radial directions at diametrically opposite positions such that the drain channels 16b are isolated from each other. The control disk 16 further includes a pair of flow rate control guide channels 16c, which is formed on the first surface having the control lever coupling hole 16a in radial directions perpendicular to the directions of the drain channels 16b at positions outside the control lever coupling hole 16a.

In the above case, the control lever coupling hole 16a, which is formed in the control disk 16 of the control unit 15, is formed as a hole having a rounded inner surface to allow the other end of the control lever 14 to smoothly move in the hole 16a in any direction.

Furthermore, the guide 17 is formed as a ring-shaped disk, with a pair of flow rate control guide ribs 17a formed on a surface of the guide 17 in radial directions at diametrically opposite positions outside a center through hole of the guide 17 to correspond to the pair of flow rate control guide channels 16c of the control disk 16. The guide 17 further includes a pair of temperature control guide ribs 17b formed on another surface of the guide 17, opposite the surface having the flow rate control guide ribs 17a, in radial directions perpendicular to the directions of the flow rate control guide ribs 17a.

The control lever support 18 is formed as a ring-shaped block having a center through hole, with an intermediate portion around an inner surface of the center through hole protruding inwards and a part of the inner surface being rounded to form a seat for the control lever 14. This support 18 includes a pair of temperature control guide channels 18a formed on a surface of the control lever support 18 to correspond to the pair of temperature control guide ribs 17b of the guide 17. The support 18 further includes a locking rib 18b to engage with a locking groove 2c formed on the inner surface of the support sleeve 2b provided in the housing 2, thus preventing movement of the control lever support 18 relative to the housing 2.

Furthermore, the water supply and discharge means 1 is formed as a ring-shaped block and comprises a pair of pipes provided at a central part of the block such that the pipes are spaced apart from each other at a predetermined interval. The first ends of the pipes are connected to respective external water supply pipe lines, while the second ends form the cold and hot water supply holes 1a and 1b which correspond to the control disk 16 of the control unit 15, with the water discharge hole 1c being defined in the block at a position outside the pipes.

In the above case, each of the pipes is preferably provided therein with a packing P, which is elastically biased by a spring S and having rectangular water passage hole.

Furthermore, the housing 2 is formed as a cylinder and includes a boss 2a, which is formed on a first end of the housing 2. A through rectangular hole 2d is formed through the center of the boss 2a and has a diameter smaller than the diameter of an opening formed at a second end of the housing 2. The support sleeve 2b extends from an inner end of the boss 2a to define a space therein to receive a control lever support 18 and bias a guide 17 of the control unit 15 to a control disk 16 at an end thereof.

The operation of the cartridge of the water supply valve will be described herein below.

First, as shown in FIG. 3, when the flow rate control knob 12, which is coupled by a hinge to the housing 2, is placed at a position inclined to a first side (typically, a position inclined rearwards based on a water supply valve having the housing 2), the control lever 14, which is supported both by the control lever support 18 and the packing P in the housing 2, pushes the control disk 16 of the control unit 15 to a second side toward the front of the housing 2. Thus, the flat surface part of the control disk 16 closes the entire part of the cold and hot water supply holes 1a and 1b of the water supply and discharge means 1 so that external water cannot flow into the cartridge 10.

Figure 4:
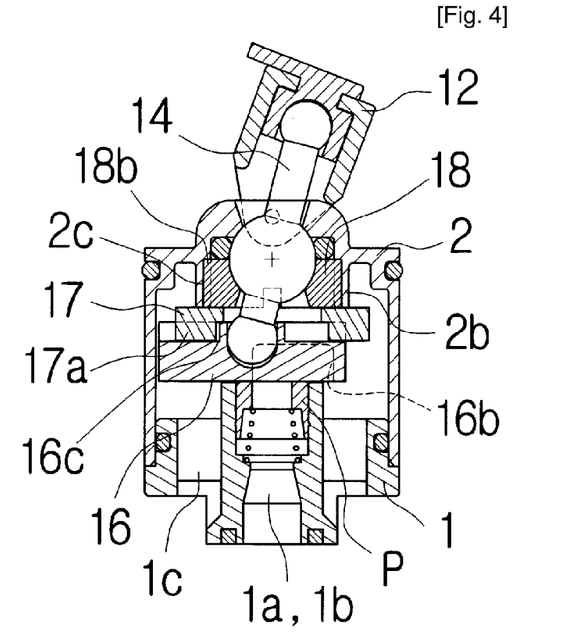
FIG. 4 is a front sectional view illustrating the construction of the cartridge according to the first embodiment of the present invention (in a opened state)

However, as shown in FIG. 4, if the flow rate control knob 12 on the housing 2 is moved forwards, the drain channels 16b of the control disk 16 are moved toward the cold and hot water supply holes 1a and 1b of the water supply and discharge means 1. Thus, the cold and hot water supply holes 1a and 1b of the water supply and discharge means 1 communicate with the water discharge hole 1c, so that water from the cold and hot water supply holes 1a and 1b is discharged to the outside of the cartridge 10 through the water discharge hole 1c.

In the above state, the range, wherein the cold and hot water supply holes 1a and 1b of the water supply and discharge means 1 are overlapped with the drain channels 16b of the control disk 16, can vary in response to manipulation of the flow rate control knob 12, so that the flow rate of water to be discharged from the cartridge 10 through the water discharge hole 1c can be controlled.

Figure 5:
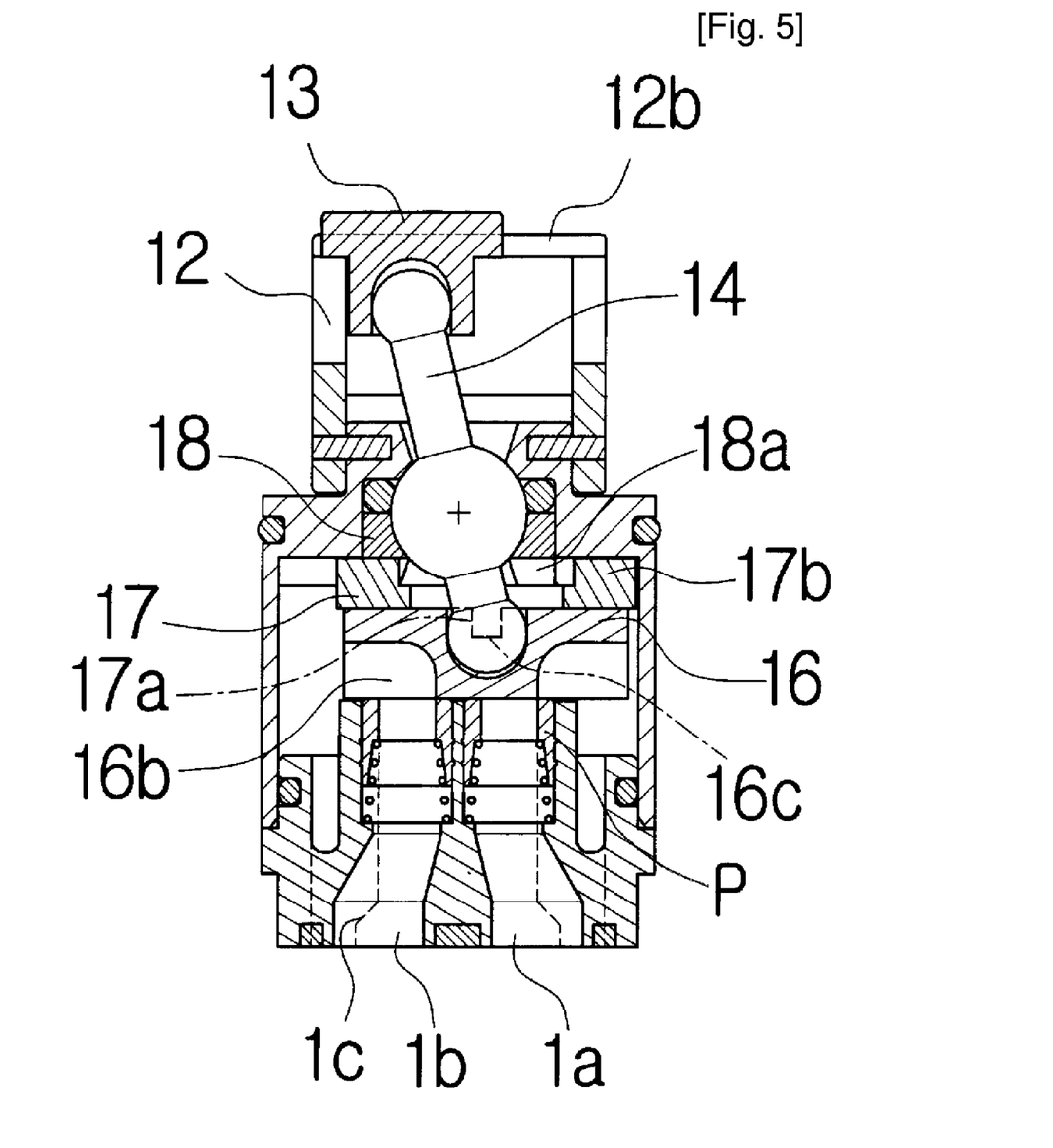
FIG. 5 is a side sectional view illustrating the construction of the cartridge according to the first embodiment of the present invention (in a cold water supplying state)

As shown in FIG. 5, if the temperature control knob 13, which can slide along the flow rate control knob 12, is placed at a first side, the control lever 14 in the housing 2 pushes the control disk 16 to a second side (for example, in a direction toward the cold water supply hole). Thus, the flat surface part of the control disk 16 closes the cold water supply hole 1a of the water supply and discharge means 1, but opens the hot water supply hole 1b of the water supply and discharge means 1. Therefore, hot water from an external hot water supply pipe can flow into the cartridge 10. If the cartridge 10 is in an opened state due to manipulation of the flow rate control knob 12, the hot water is discharged to the outside of the water supply valve through the water discharge hole 1c.

Figure 6:
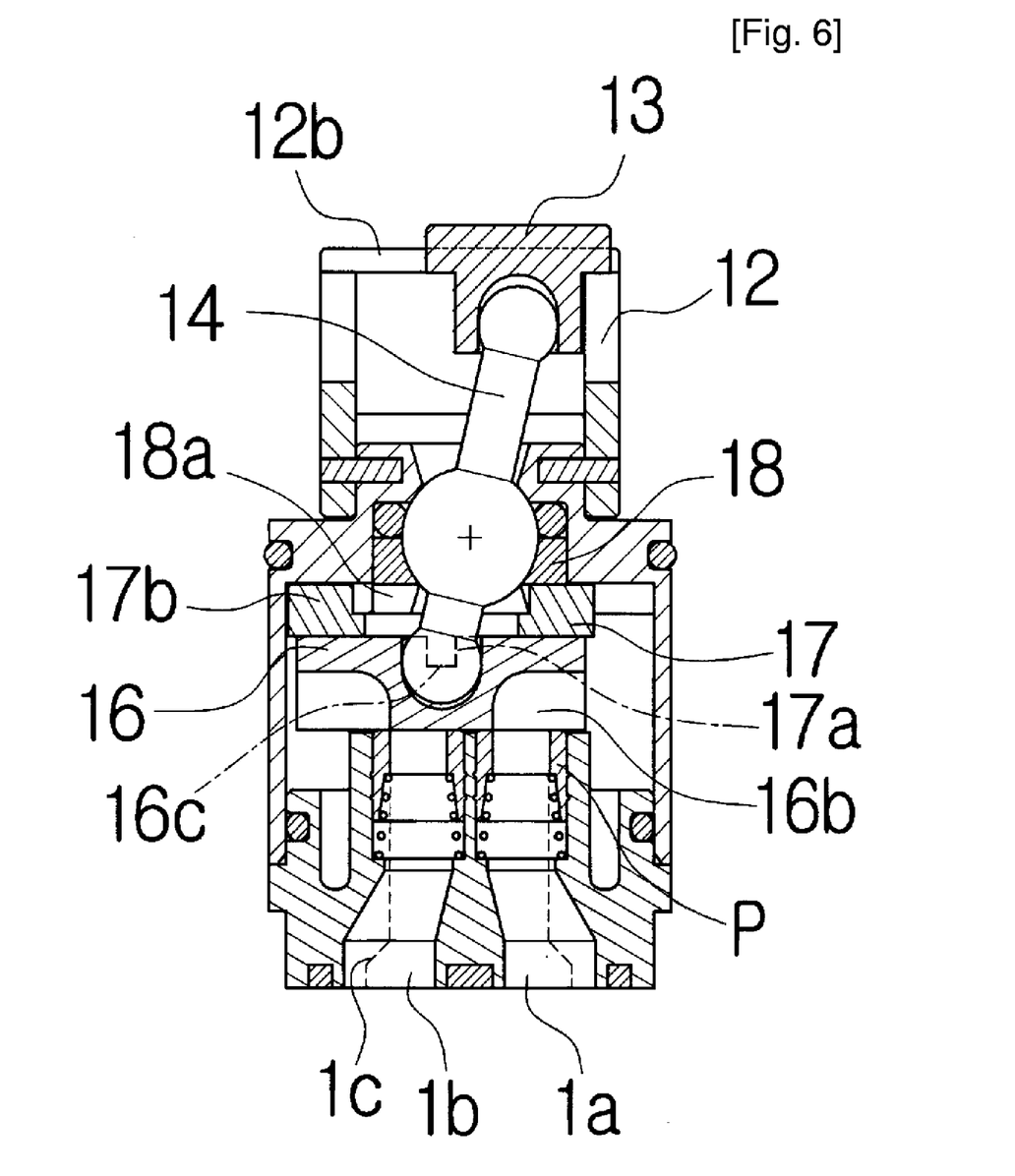
FIG. 6 is a side sectional view illustrating the construction of the cartridge according to the first embodiment of the present invention (in a hot water supplying state)

As shown in FIG. 6, if the temperature control knob 13 is moved from the first side to the second side, the control lever 14 in the housing 2 pushes the control disk 16 to the first side, which is aligned with the hot water supply hole 1b and at which the temperature control knob 13 is placed. Thus, the flat surface part of the control disk 16 closes the hot water supply hole 1b of the water supply and discharge means 1, but opens the cold water supply hole 1b. Therefore, cold water from an external cold water supply pipe flows into the cartridge 10. If the cartridge 10 is in an opened state due to manipulation of the flow rate control knob 12, the cold water is discharged to the outside of the water supply valve through the water discharge hole 1c.

In the above state, the temperature of water to be discharged from the cartridge through the water discharge hole can be controlled by changing the cross sections of opened parts of the cold and hot water supply holes 1a and 1b of the water supply and discharge means 1, which are overlapped with the drain channels 16b of the control disk 16 and which can vary in response to manipulation of the temperature control knob 13.

Thus, in the cartridge of the present invention, the flow rate of water can be controlled by angularly moving the flow rate control knob forwards and rearwards, while the temperature of water can be controlled by rectilinearly moving the temperature control knob leftwards and rightwards. Thus, the cartridge of this invention can control the flow rate and temperature of water without causing interference between flow rate control operation and temperature control operation of the water supply valve.

Figure 7:
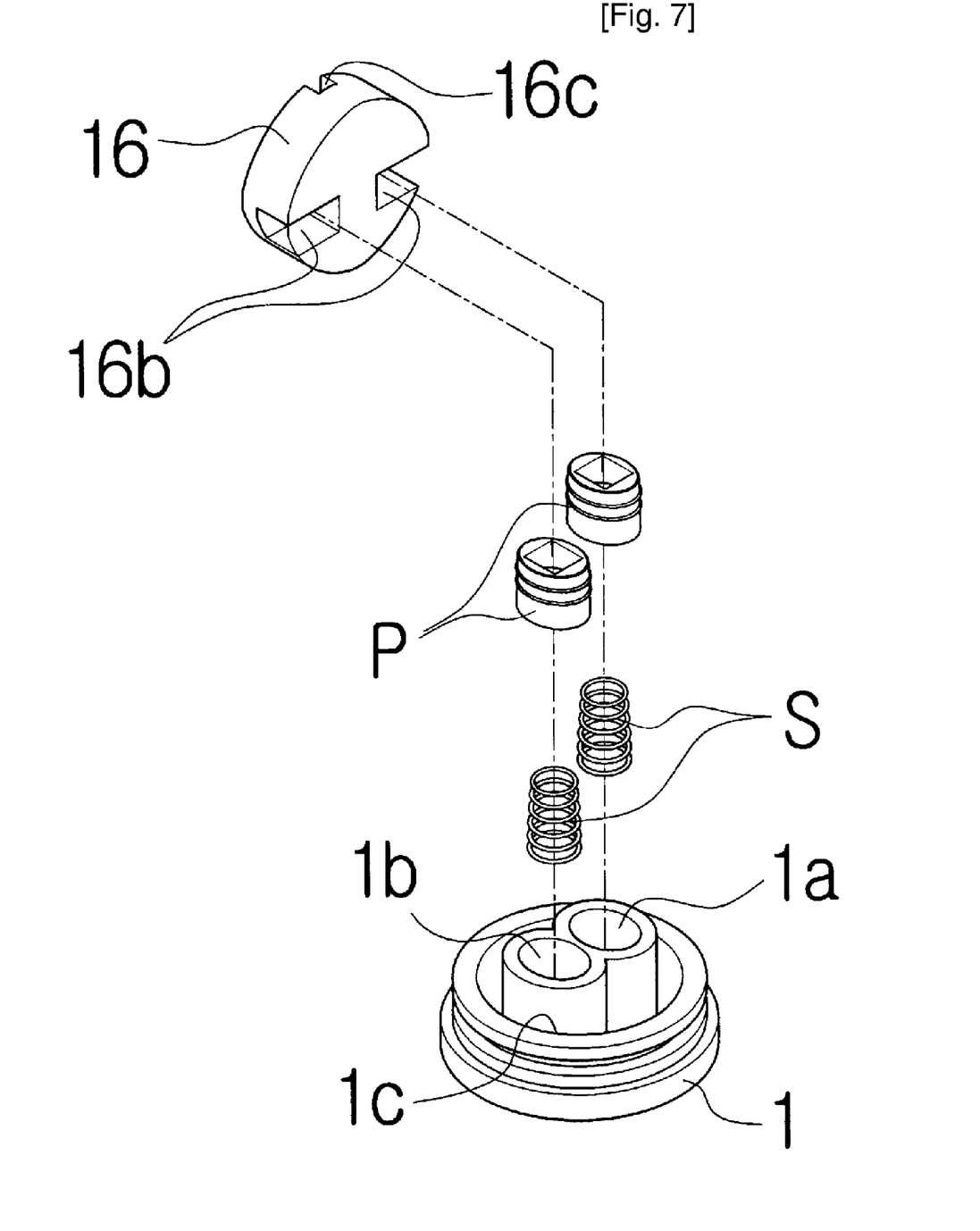
FIG. 7 is an exploded perspective view illustrating the relation among the drain channel of the control disk, rectangular through hole of the packing and cold and hot water supply hole.

Furthermore, as shown in FIG. 7, the through hole of the packing P has a rectangular shape so that the packing forms a variable water passage having a rectangular cross-section, in cooperation with the rectangular drain channels 16b of the control disk 16. Thus, the cartridge of the present invention does not change the mixing ratio of the cold and hot water.

Figure 8:
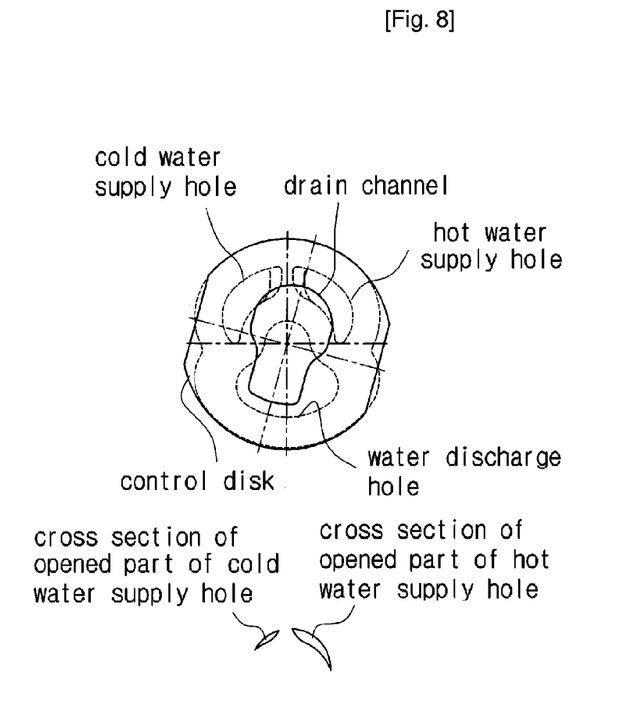
FIGS. 8 through 10 are sectional views illustrating a variation in opening ratio of both a hot water outlet hole and a cold water outlet hole in a conventional cartridge of a water supply valve during operation of the cartridge to control the flow rate of hot and cold water.
Figure 9:
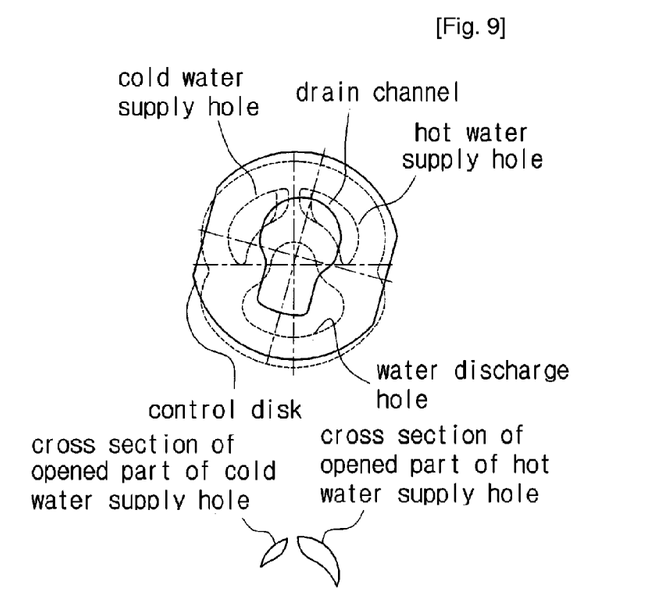
Figure 10:
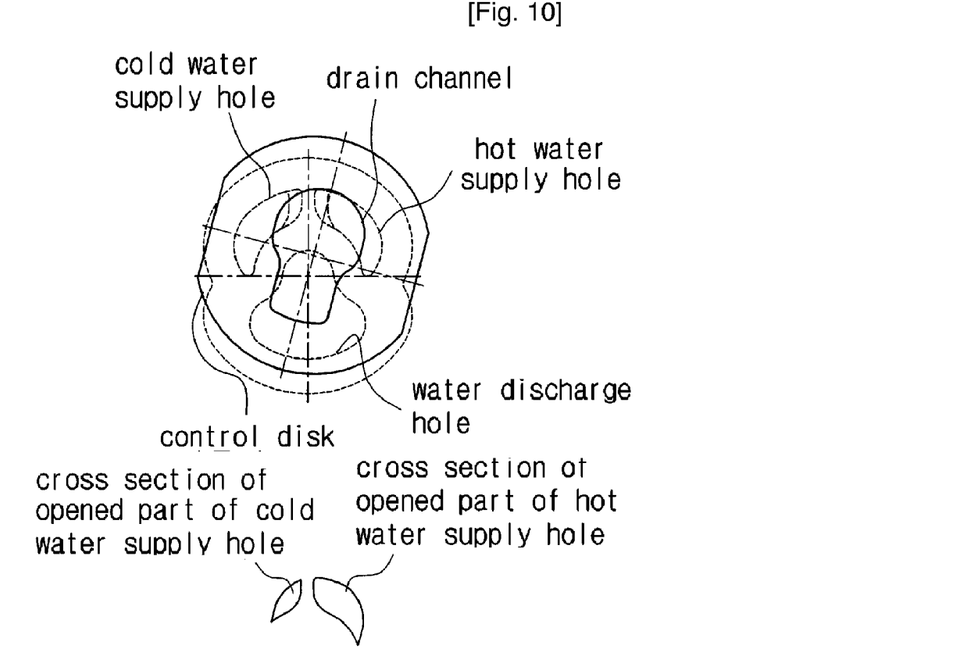

Described in detail, as shown in FIGS. 8, 9 and 10, the variable water passage, which is formed by the cold and hot water supply holes and the drain channel in a conventional cartridge and discharges water from the cartridge to the outside, is defined by a curved side, so that the cross section of the cold and hot water supply holes of the conventional cartridge are undesirably changed during flow rate control operation. Therefore, the temperature of water to be discharged from the water supply valve may be undesirably changed during flow rate control operation.

Figure 11:
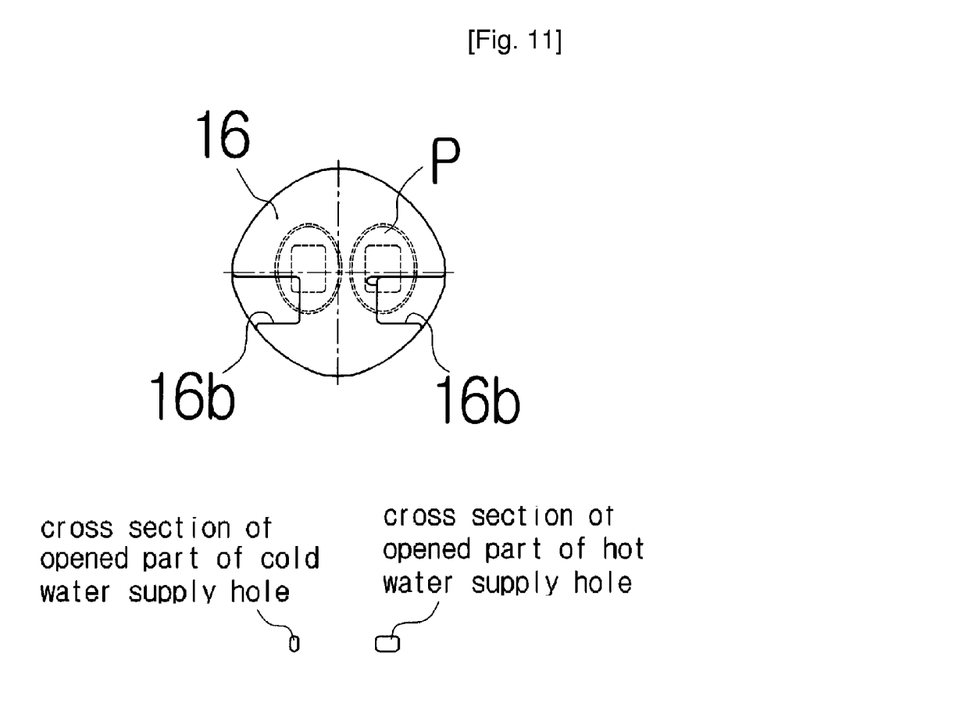
FIGS. 11 through 13 are sectional views illustrating a variation in opening ratio of both a hot water outlet hole and a cold water outlet hole in a cartridge of a water supply valve according to the present invention during operation of the cartridge to control the flow rate of hot and cold water.
Figure 12:
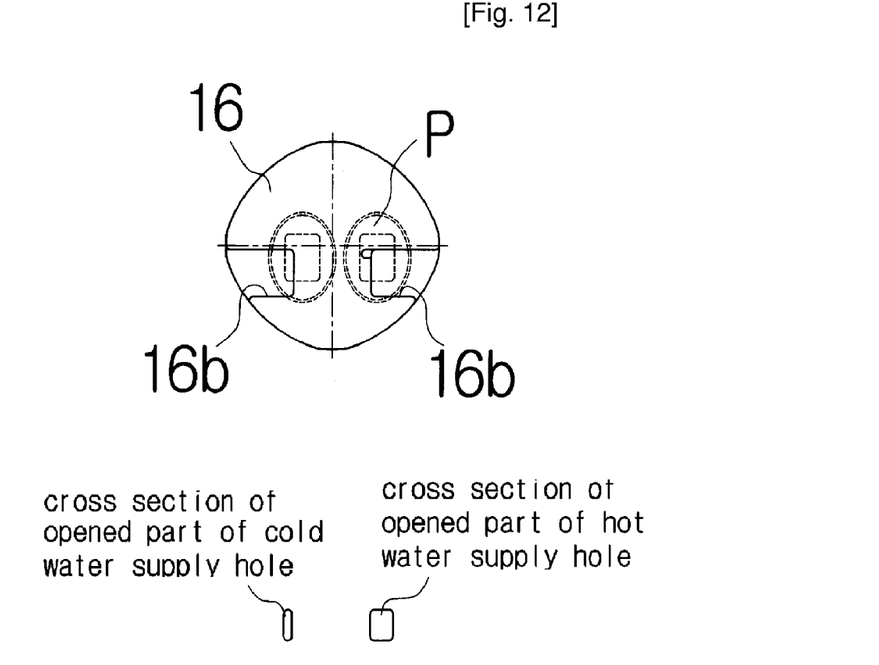
Figure 13:
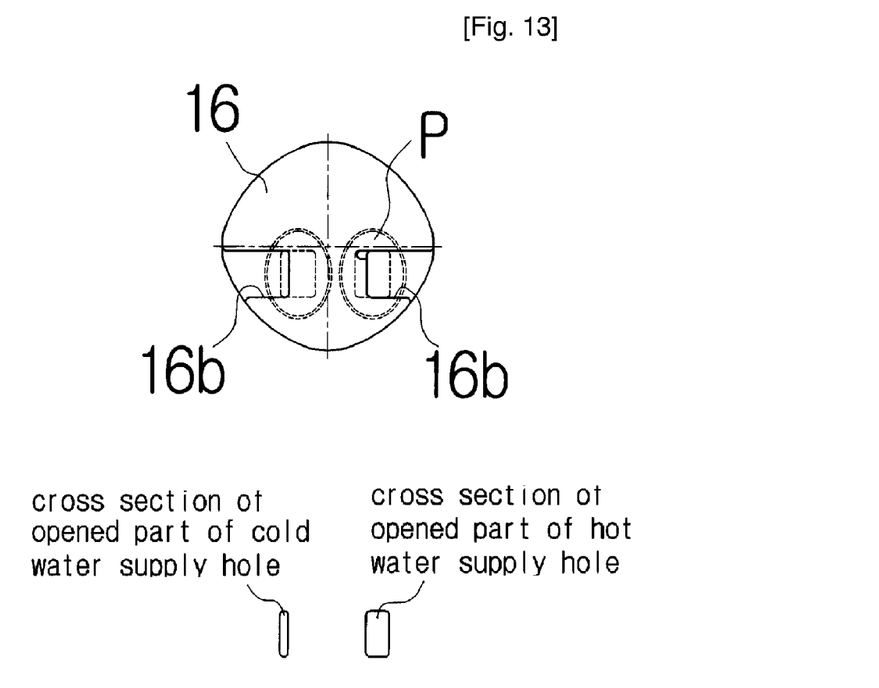

However, in the present invention, each of the drain channels 16b of the control disk has rectilinear sides (to form a rectangular cross-section of the drain channels) and, furthermore, each of the water passage holes of the packings P has rectilinear sides (to form a rectangular cross-section of the passage holes). Thus, as shown in FIGS. 11, 12 and 13, although the cross sections of the passage holes of the packings P vary during flow rate control operation, the opening ratio of the water discharge hole to discharge a mix of the cold and hot water to the outside of the cartridge is not changed, so that the temperature of discharged water is kept unchanged.

Thus, the cartridge of the water supply valve according to the present invention does not change temperature of water during flow control operation, so that, while a user takes a shower in a shower stall, the cartridge of this invention does not unexpectedly change the temperature of water by the flow rate controlling. Therefore, the user of this cartridge does not feel uncomfortable while taking a shower.

Figure 14:
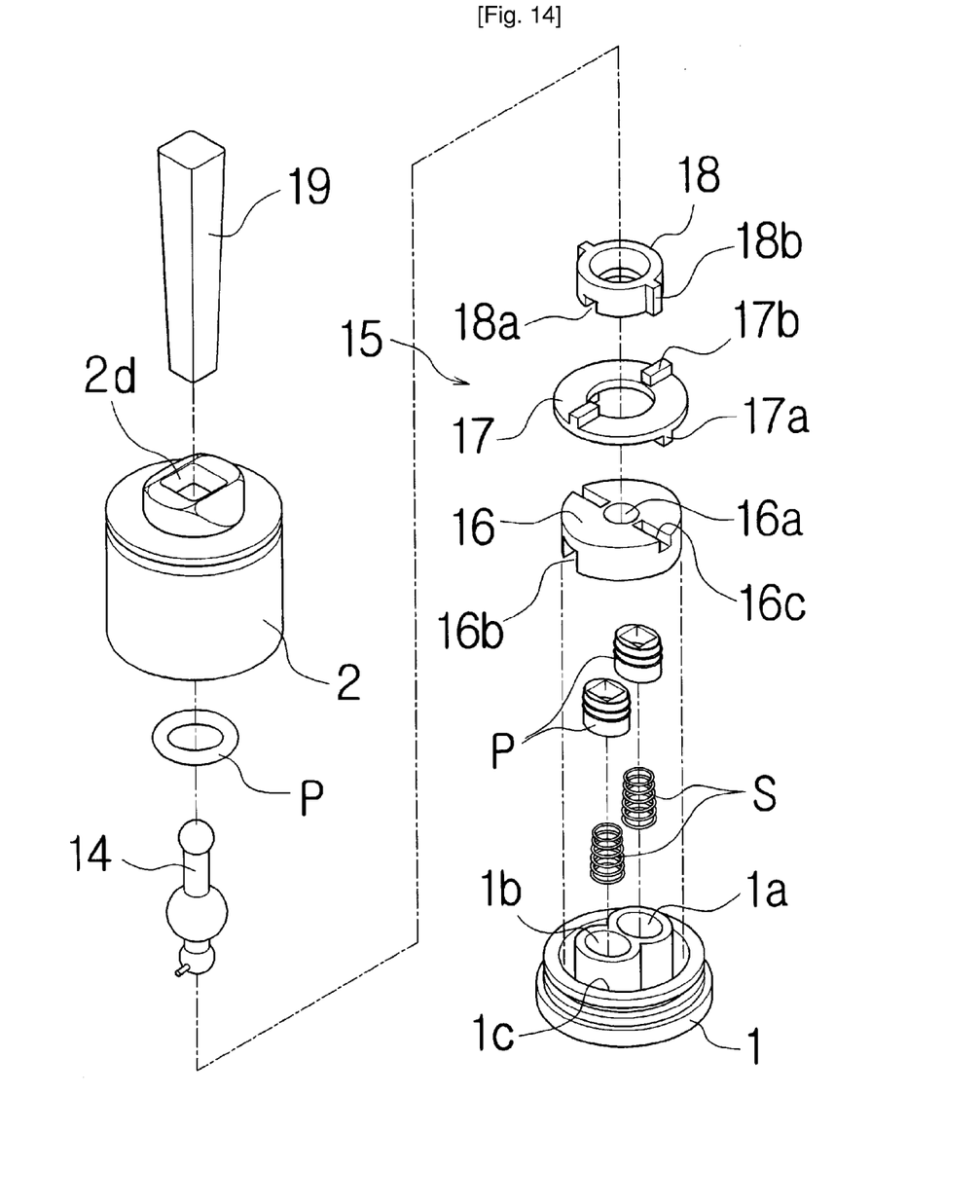
FIG. 14 is an exploded perspective view illustrating the construction of a cartridge of a water supply valve according to the second embodiment of the present invention.
Figure 15:
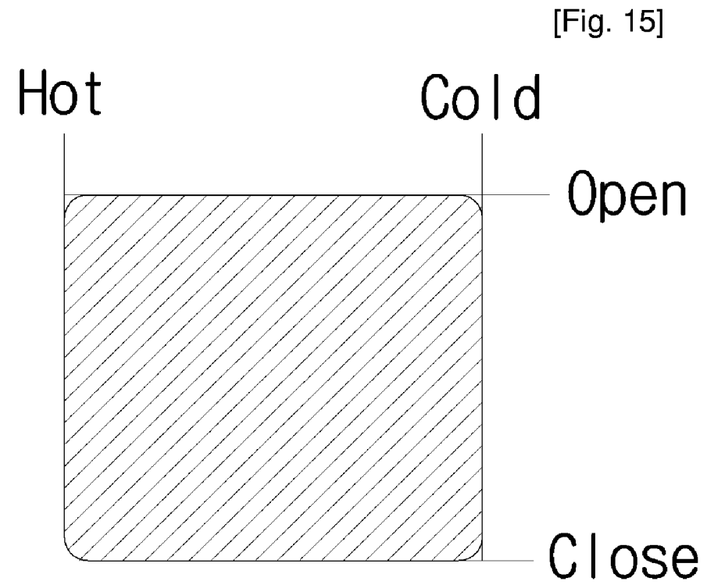
FIG. 15 is a diagram schematically illustrating the relationship between the flow rate control operation and the temperature control operation according to the present invention.

Furthermore, in the present invention, as shown in FIG. 14, a single control knob 19 may be used instead of the two control knobs, which are the flow rate control knob 12 and the temperature control knob 13. In the above case, the control knob 19 can be easily manipulated to either side within a rectangular range as shown in FIG. 15 so that, if the control knob 19 is manipulated from any position to a side to close the cartridge, the cartridge can reliably stop the discharge of water therefrom.

Figure 16:
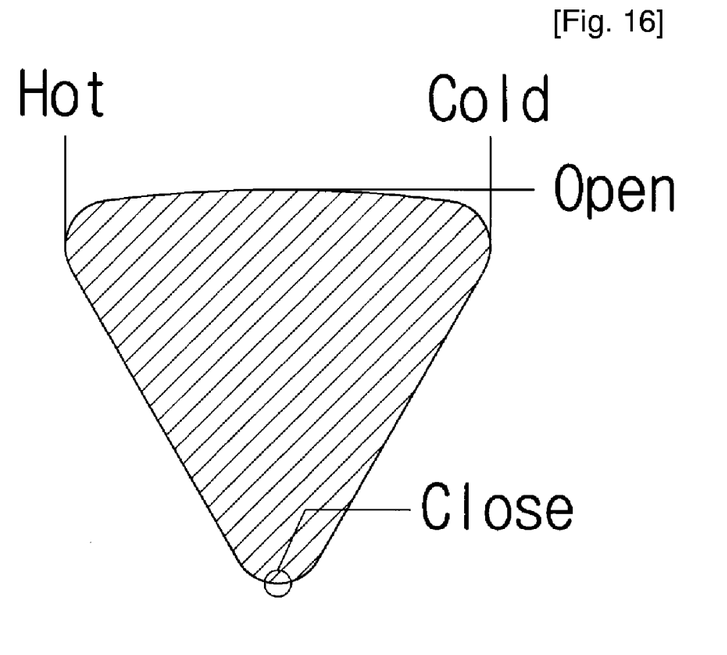
FIG. 16 is a diagram schematically illustrating the relationship between the flow rate control operation and the temperature control operation according to a conventional joystick motion.

However, in the operation of a cartridge having a conventional joystick, the manipulation range for the joystick forms the shape of a fan, as shown in FIG. 16. Thus, the ranges for controlling the flow rate and temperature of water are narrow, so that it is very difficult to control either the flow rate or the temperature of water. Furthermore, this conventional joystick must be manipulated to a precise point to close the cartridge, so that, if a user fails to execute a precise joystick manipulation, the cartridge having the joystick causes a problem in that water may leak from the cartridge.

INDUSTRIAL APPLICABILITY

The present invention provides a cartridge of a water supply valve, which is operated such that the flow rate of water is controlled by angularly moving the flow rate control knob forwards or rearwards and the temperature of water is controlled by linearly moving the temperature control knob leftwards or rightwards. This cartridge controls the flow rate and temperature of water without causing interference between the flow rate control operation and the temperature control operation. Thus, this cartridge does not change the existing temperature of water during flow rate control operation or change the existing flow rate of water during temperature control operation. Therefore, the present invention reduces the quantity of water to be unnecessarily wasted and, at the same time, prevents undesirable consumption of excessive energy.

The invention claimed is:

1. A cartridge of a water supply valve, comprising:
water supply and discharge means (1) provided with cold and hot water supply holes (1a and 1b) to separately supply cold and hot water into the cartridge and a water discharge hole (1c) to discharge a mix of the cold and hot water from the cartridge; a control unit (15) to open or close the cold and hot water supply holes (1a and 1b) of the water supply and discharge means (1); and
a housing (2) assembled at a first end thereof with an end of the water supply and discharge means (1) to define a chamber therein and receiving elements of the cartridge in the chamber to protect the elements,
wherein the cartridge further comprises valve control means (11) which includes:
a flow rate control knob (12) coupled by a hinge to a second end of the housing (2), which is assembled with the water supply and discharge means (1), so that the flow rate control knob (12) is moved back and forth in a first direction and within a pre-determined angular movement range and actuates a control lever (14), an end of which is coupled to the control unit (15), thus causing the control unit (15) to open or close the cold and hot water supply holes (1a and 1b) of the water supply and discharge means (1); and
a temperature control knob (13) slidably and movably coupled on the flow rate control knob (12) such that the temperature control knob (13) linearly moves back and forth in a second direction perpendicular to the first movement direction of the flow rate control knob (12) and within a predetermined linear movement range without causing interference with operation of the flow rate control knob (12), and actuates the control lever (14), which is coupled to the control unit (15), thus causing the control unit (15) to control the opening ratios of the cold and hot water supply holes (1a and 1b) of the water supply and discharge means (1).

2. The cartridge of the water supply valve according to claim 1, wherein the flow rate control knob (12) of the valve control means (11) comprises:
a plurality of hinge brackets (12a) formed on the flow rate control knob (12), spaced apart from each other by a predetermined distance and coupled to the housing (2) by the hinge; and
a pair of slide rails (12b) symmetrically formed on an end of the flow rate control knob (12) opposite to the end having the hinge brackets (12a), such that the slide rails (12b) extend parallel to and spaced apart from each other at a predetermined interval.

3. The cartridge of the water supply valve according to claim 1, wherein the temperature control knob (13) of the valve control means (11) comprises:
a slide groove (13a) for engaging with the slide rail (12b) of the flow rate control knob (12); and
a lever coupling hole (13b) formed on an end surface of the temperature control knob (13) to seat an end of the control lever (14) therein.

4. The cartridge of the water supply valve according to claim 1, wherein the control lever (14) is formed as a rod-shaped body and comprises:
end joint balls, having a diameter larger than a diameter of a rod part of the control lever (14), formed at opposite ends of the control lever (14) and coupled to respective control lever coupling holes (13b and 16a) of both the temperature control knob (13) and a control disk (16); and
an intermediate ball, having a diameter larger than the diameter of the end joint balls, formed around an intermediate portion of the control lever (14) and seated in a rounded seat formed in a control lever support (18) and functioning as a center of pivot of the control lever (14) during rotation of the lever (14).

5. The cartridge of the water supply valve according to claim 1, wherein the control unit (15) comprises:
a control disk (16) to open or close the cold and hot water supply holes (1a and 1b) of the water supply and discharge means (1); and
a guide (17) to guide rectilinear movement of the control disk (16) in a direction corresponding to the first movement direction of the flow rate control knob (12), thus causing the control disk (16) to open or close the cold and hot water supply holes (1a and 1b) of the water supply and discharge means (1).

6. The cartridge of the water supply valve according to claim 5, wherein the control unit (15) further comprises:
a control lever support (18), which guides linear movement of the guide (17) in a direction corresponding to the second movement direction of the temperature control knob (13), thus causing the guide (17) to guide rectilinear movement of the control disk (16) in the second movement direction, and supports the control lever (14) therein such that the control lever (14) acts in leverage.

7. The cartridge of the water supply valve according to claim 5, wherein the control disk (16) is formed as a disk having a predetermined thickness, and comprises:
a control lever coupling hole (16a) formed on a center of a first surface of the control disk (16) to receive therein an end of the control lever (14);
a pair of drain channels (16b) formed on a second surface of the control disk (16), opposite the first surface having the control lever coupling hole (16a), in radial directions at diametrically opposite positions such that the drain channels (16b) are isolated from each other; and
a pair of flow rate control guide channels (16c) formed on the first surface having the control lever coupling hole (16a) in radial directions perpendicular to the directions of the drain channels (16b) at positions outside the control lever coupling hole (16a).

8. The cartridge of the water supply valve according to claim 5, wherein the guide (17) is formed as a ring-shaped disk and comprises:
a pair of flow rate control guide ribs (17a) formed on a surface of the guide (17) in radial directions at diametrically opposite positions outside a center through hole of the guide (17) to correspond to the pair of flow rate control guide channels (16c) of the control disk (16); and
a pair of temperature control guide ribs (17b) formed on another surface of the guide (17), opposite the surface having the flow rate control guide ribs (17a), in radial directions perpendicular to the directions of the flow rate control guide ribs (17a).

9. The cartridge of the water supply valve according to claim 6, wherein the control lever support (18) is formed as a ring-shaped block having a center through hole, with an intermediate portion around an inner surface of the center through hole protruding inwards and a part of the inner surface being rounded to form a seat for the control lever (14), and comprises:
a pair of temperature control guide channels (18a) formed on a surface of the control lever support (18) to correspond to the pair of temperature control guide ribs (17b) of the guide (17); and
a locking rib (18b) to engage with a locking groove (2c) formed on an inner surface of a support sleeve (2b) provided in the housing (2), thus preventing movement of the control lever support (18) relative to the housing (2).

10. The cartridge of the water supply valve according to claim 6, wherein the water supply and discharge means (1) is formed as a ring-shaped block and comprises:
a pair of pipes provided at a central part of the block such that the pipes are spaced apart from each other at a predetermined interval, the pipes having first ends connected to respective external water supply pipe lines and second ends forming the cold and hot water supply holes (1a and 1b) which correspond to the control disk (16) of the control unit (15), with the water discharge hole (1c) being defined in the block at a position outside the pipes.

11. The cartridge of the water supply valve according to claim 1, wherein the housing (2) is formed as a cylinder and comprises:
a boss (2a) formed on a first end of the housing (2), with a through rectangular hole (2d) being formed through the center of the boss (2a) and having a diameter smaller than a diameter of an opening formed at a second end of the housing (2), and a support sleeve (2b) extending from an inner end of the boss (2a) to define a space therein to receive a control lever support (18) and bias a guide (17) of the control unit (15) to a control disk (16) at an end thereof.

12. The cartridge of the water supply valve according to claim 11, wherein the through hole (2d) formed in the boss (2a) of the housing (2) has a rectangular cross-section.

13. The cartridge of the water supply valve according to claim 1, wherein the water supply and discharge means (1) further comprises:
a packing (P) having a rectangular through hole and being inserted in each of the cold and hot water supply holes (1a and 1b) so that the packing forms a variable water passage having a rectangular cross-section, in cooperation with rectangular drain channels (16b) of a control disk (16).

14. A cartridge of a water supply valve, comprising:
water supply and discharge means (1) provided with cold and hot water supply holes (1a and 1b) to separately supply cold and hot water into the cartridge and a water discharge hole (1c) to discharge a mix of the cold and hot water from the cartridge; a control unit (15) to open or close the cold and hot water supply holes (1a and 1b) of the water supply and discharge means (1);

a housing (2) assembled at a first end thereof with an end of the water supply and discharge means (1) to define a chamber therein and receiving elements of the cartridge in the chamber to protect the elements;

a flow rate control knob (12) coupled by a hinge to a second end of the housing (2), which is assembled with the water supply and discharge means (1), so that the flow rate control knob (12) is moved back and forth in a first direction and within a pre-determined angular movement range and actuates a control lever (14), an end of which is coupled to the control unit (15), thus causing the control unit (15) to open or close the cold and hot water supply holes (1a and 1b) of the water supply and discharge means (1); and a temperature control knob (13) slidably and movably coupled on the flow rate control knob (12) such that the temperature control knob (13) linearly moves back and forth in a second direction perpendicular to the first movement direction of the flow rate control knob (12) and within a predetermined linear movement range without causing interference with operation of the flow rate control knob (12), and actuates the control lever (14), which is coupled to the control unit (15), thus causing the control unit (15) to control the opening ratios of the cold and hot water supply holes (1a and 1b) of the water supply and discharge means (1);

wherein the flow rate control knob (12) includes at least one hinge bracket (12a) coupled to the housing (2) by the hinge, and a pair of slide rails (12b) symmetrically formed on an end of the flow rate control knob (12) opposite to the end having the hinge bracket (12a) such that the slide rails (12b) extend parallel to and spaced apart from each other at a predetermined interval;

wherein the temperature control knob (13) includes a slide groove (13a) for engaging with the slide rail (12b) of the flow rate control knob (12), and a lever coupling hole (13b) formed on a surface of the temperature control knob (13) to seat an end of the control lever (14) therein.

15. The cartridge of the water supply valve according to claim 14, wherein the control unit (15) comprises:

a control disk (16) to open or close the cold and hot water supply holes (1a and 1b) of the water supply and discharge means (1); and a guide (17) to guide rectilinear movement of the control disk (16) in a direction corresponding to the first movement direction of the flow rate control knob (12), thus causing the control disk (16) to open or close the cold and hot water supply holes (1a and 1b) of the water supply and discharge means (1).

16. The cartridge of the water supply valve according to claim 15, wherein the control unit (15) further comprises:

a control lever support (18), which guides linear movement of the guide (17) in a direction corresponding to the second movement direction of the temperature control knob (13), thus causing the guide (17) to guide rectilinear movement of the control disk (16) in the second movement direction to control the opening ratios of the cold and hot water supply holes (1a and 1b) of the water supply and discharge means (1).

* * * * *